(12) United States Patent
Sumsion et al.

(10) Patent No.: US 9,489,054 B1
(45) Date of Patent: Nov. 8, 2016

(54) KEYBOARD FOLIO WITH ATTACHMENT STRIP

(71) Applicant: ZAGG Intellectual Property Holding Co., Inc., Midvale, UT (US)

(72) Inventors: Cecily Sumsion, Draper, UT (US); Dan Oakeson, West Jordan, UT (US)

(73) Assignee: ZAGG Intellectual Property Holding Co., Inc., Midvale, UT (US)

( * ) Notice: Subject to any disclaimer, the term of this patent is extended or adjusted under 35 U.S.C. 154(b) by 0 days.

(21) Appl. No.: 15/150,748

(22) Filed: May 10, 2016

Related U.S. Application Data

(60) Provisional application No. 62/275,156, filed on Jan. 5, 2016.

(51) Int. Cl.
| | | |
|---|---|---|
| *H05K 7/00* | (2006.01) | |
| *H05K 5/00* | (2006.01) | |
| *G06F 3/02* | (2006.01) | |
| *G06F 1/16* | (2006.01) | |

(52) U.S. Cl.
CPC ........... *G06F 3/0208* (2013.01); *G06F 1/1616* (2013.01); *G06F 1/1626* (2013.01); *G06F 1/1681* (2013.01)

(58) Field of Classification Search
CPC ............................ G06F 1/1684; G06F 1/1669
USPC ........................ 361/679.01–679.21
See application file for complete search history.

(56) References Cited

U.S. PATENT DOCUMENTS

| 676,449 | A | 6/1901 | Schwarz |
|---|---|---|---|
| 4,259,568 | A | 3/1981 | Dynesen |
| D279,185 | S | 6/1985 | Felix et al. |
| 5,375,076 | A | 12/1994 | Goodrich et al. |
| 5,383,138 | A | 1/1995 | Motoyama et al. |
| 5,383,139 | A | 1/1995 | Saji et al. |
| 5,457,453 | A | 10/1995 | Chiu et al. |
| 5,594,619 | A | 1/1997 | Miyagawa et al. |
| 5,666,694 | A | 9/1997 | Slow et al. |
| 5,737,183 | A | 4/1998 | Kobayashi et al. |
| 5,847,698 | A | 12/1998 | Reavey et al. |
| 5,987,704 | A | 11/1999 | Tang |
| 6,144,551 | A | 11/2000 | Kao |
| 6,219,230 | B1 | 4/2001 | Cho |
| 6,253,419 | B1 | 7/2001 | Lu |
| 6,304,433 | B2 | 10/2001 | O'Neal et al. |
| 6,370,018 | B1 | 4/2002 | Miller, Jr. et al. |
| D457,525 | S | 5/2002 | Olodort et al. |
| 6,457,996 | B1 | 10/2002 | Shih |

(Continued)

OTHER PUBLICATIONS

Folding Keyboard, by Yoonsang Kim & Eunsung Park; htp//www.yankodesign.com/2009/12/11/folding-fan-is_a_keyboard/ accessed Dec. 11, 2009; pp. 3.

(Continued)

*Primary Examiner* — Jerry Wu

(74) *Attorney, Agent, or Firm* — Thorpe, North & Western, LLP

(57) ABSTRACT

A keyboard folio comprises a shell to receive a tablet computer. The shell has an attachment strip along a side thereof. A wireless keyboard has a keyboard panel with an alphanumeric keyboard pivotally coupled to an attachment bar. The attachment bar of the wireless keyboard removably attaches to the attachment strip of the shell in a fixed relationship. The keyboard panel pivots with respect to the attachment bar, and thus the shell.

20 Claims, 9 Drawing Sheets

(56) References Cited

U.S. PATENT DOCUMENTS

| | | |
|---|---|---|
| 6,493,216 B1 | 12/2002 | Lin |
| 6,498,718 B1 | 12/2002 | Kim et al. |
| 6,498,720 B2 | 12/2002 | Glad |
| 6,517,129 B1 | 2/2003 | Chien et al. |
| 6,614,649 B1 | 9/2003 | Wang |
| 6,694,570 B2 | 2/2004 | Chen |
| 6,700,775 B1 | 3/2004 | Chuang et al. |
| 6,768,635 B2 | 7/2004 | Lai et al. |
| 6,771,494 B2 | 8/2004 | Shimano |
| 6,774,888 B1 | 8/2004 | Genduso |
| 6,785,128 B1 | 8/2004 | Yun |
| 6,898,073 B2 | 5/2005 | Lin |
| 6,920,039 B2 | 7/2005 | Mochizuki et al. |
| 6,937,468 B2 | 8/2005 | Lin et al. |
| 7,017,243 B2 | 3/2006 | Carnevali |
| 7,042,712 B2 | 5/2006 | Ghosh et al. |
| 7,085,129 B2 | 8/2006 | Hsu |
| 7,123,242 B1 | 10/2006 | Henty |
| 7,129,931 B2 | 10/2006 | Pappas |
| 7,318,521 B2 | 1/2008 | Lau |
| 7,393,151 B1 | 7/2008 | Miller, Jr. |
| 7,477,508 B1 | 1/2009 | Pilkington et al. |
| 7,484,271 B2 | 2/2009 | Oshima et al. |
| 7,502,225 B2 | 3/2009 | Solomon et al. |
| 7,540,675 B2 | 6/2009 | Liu |
| 7,541,907 B2 | 6/2009 | Wang et al. |
| 7,583,500 B2 | 9/2009 | Ligtenberg et al. |
| 7,612,989 B2 | 11/2009 | Northway |
| 7,626,357 B2 | 12/2009 | Hoffman et al. |
| D611,045 S | 3/2010 | Andre et al. |
| 7,672,699 B2 | 3/2010 | Kim et al. |
| 7,730,587 B2 | 6/2010 | Chang et al. |
| D620,001 S | 7/2010 | Reed et al. |
| D637,596 S | 5/2011 | Akana et al. |
| 7,966,040 B2 | 6/2011 | Kim et al. |
| D643,433 S | 8/2011 | Hsieh et al. |
| D652,831 S | 1/2012 | Lee et al. |
| 8,139,357 B2 | 3/2012 | Trang |
| 8,143,983 B1 | 3/2012 | Lauder et al. |
| D659,139 S | 5/2012 | Gengler |
| 8,230,992 B2 | 7/2012 | Law et al. |
| 8,253,595 B2 | 8/2012 | Yang et al. |
| D671,541 S | 11/2012 | Gengler |
| D672,352 S | 12/2012 | Gengler |
| D673,574 S | 1/2013 | Gengler |
| 8,363,014 B2 | 1/2013 | Leung et al. |
| D676,031 S | 2/2013 | Melville et al. |
| D676,448 S | 2/2013 | Gorman et al. |
| D676,449 S | 2/2013 | Probst et al. |
| D676,853 S | 2/2013 | Gengler |
| 8,385,063 B2 | 2/2013 | Zhu et al. |
| D678,885 S | 3/2013 | Gengler |
| 8,390,412 B2 | 3/2013 | Lauder et al. |
| D679,277 S | 4/2013 | Probst et al. |
| D682,274 S | 5/2013 | Gengler |
| D684,963 S | 6/2013 | Goodrich |
| 8,467,186 B2 | 6/2013 | Zeliff et al. |
| D689,054 S | 9/2013 | Snyder |
| 8,542,495 B1 | 9/2013 | Gorman et al. |
| 8,570,726 B2 | 10/2013 | Wu et al. |
| D692,886 S | 11/2013 | Bates et al. |
| D694,248 S | 11/2013 | Van Natta |
| 8,599,542 B1 | 12/2013 | Healey et al. |
| D701,210 S | 3/2014 | Bates et al. |
| D701,857 S | 4/2014 | Ding |
| 8,817,457 B1 * | 8/2014 | Colby .................. G06F 1/1669 206/320 |
| D714,790 S | 10/2014 | Probst et al. |
| D722,057 S | 2/2015 | Schoenith et al. |
| D727,917 S | 4/2015 | Yeo |
| 9,172,419 B2 | 10/2015 | Su et al. |
| 2001/0009500 A1 | 7/2001 | Selker |
| 2001/0040559 A1 | 11/2001 | Bullister |
| 2002/0033761 A1 | 3/2002 | Katakami et al. |
| 2002/0159226 A1 | 10/2002 | Huang et al. |
| 2003/0017746 A1 | 1/2003 | Lee |
| 2003/0048595 A1 | 3/2003 | Hsieh et al. |
| 2003/0112585 A1 | 6/2003 | Silvester |
| 2003/0112590 A1 | 6/2003 | Shimano et al. |
| 2003/0198008 A1 | 10/2003 | Leapman et al. |
| 2004/0004809 A1 | 1/2004 | Mochizuki et al. |
| 2004/0033096 A1 | 2/2004 | Choi et al. |
| 2004/0114315 A1 | 6/2004 | Anlauff |
| 2004/0136149 A1 | 7/2004 | Wang et al. |
| 2004/0159762 A1 | 8/2004 | Ghosh |
| 2004/0160735 A1 | 8/2004 | Ghosh et al. |
| 2004/0169995 A1 | 9/2004 | Ghosh et al. |
| 2004/0195305 A1 | 10/2004 | Dotson |
| 2004/0209489 A1 | 10/2004 | Clapper |
| 2004/0212954 A1 | 10/2004 | Ulla et al. |
| 2004/0232302 A1 | 11/2004 | Huang et al. |
| 2005/0052831 A1 | 3/2005 | Chen |
| 2005/0122671 A1 | 6/2005 | Homer |
| 2005/0146446 A1 | 7/2005 | Hsu |
| 2005/0155182 A1 | 7/2005 | Han et al. |
| 2005/0168925 A1 | 8/2005 | Fang et al. |
| 2005/0200608 A1 | 9/2005 | Ulla et al. |
| 2005/0236869 A1 | 10/2005 | Ka et al. |
| 2006/0007645 A1 | 1/2006 | Chen et al. |
| 2006/0044288 A1 | 3/2006 | Nakamura et al. |
| 2006/0071820 A1 | 4/2006 | Wang et al. |
| 2006/0152894 A1 | 7/2006 | Moengen |
| 2006/0152897 A1 | 7/2006 | Hirayama |
| 2006/0214916 A1 | 9/2006 | Mulford |
| 2006/0256511 A1 | 11/2006 | Ma |
| 2006/0262496 A1 | 11/2006 | Lee |
| 2006/0264243 A1 | 11/2006 | Aarras |
| 2007/0008291 A1 | 1/2007 | Liu |
| 2007/0091553 A1 | 4/2007 | Chang |
| 2007/0097087 A1 | 5/2007 | Homer et al. |
| 2007/0203963 A1 | 8/2007 | Chen et al. |
| 2008/0084396 A1 | 4/2008 | Pen |
| 2008/0119250 A1 | 5/2008 | Cho et al. |
| 2008/0125200 A1 | 5/2008 | Park et al. |
| 2008/0139261 A1 | 6/2008 | Cho et al. |
| 2008/0176610 A1 | 7/2008 | Pan et al. |
| 2008/0194139 A1 | 8/2008 | Chan |
| 2008/0225471 A1 | 9/2008 | Takizawa |
| 2008/0273012 A1 | 11/2008 | Bullister |
| 2009/0000062 A1 | 1/2009 | Yamanami |
| 2009/0017883 A1 | 1/2009 | Lin |
| 2009/0056073 A1 | 3/2009 | Lin |
| 2009/0086424 A1 | 4/2009 | Jette |
| 2010/0123663 A1 | 5/2010 | Leung et al. |
| 2010/0141588 A1 | 6/2010 | Kimura et al. |
| 2010/0157518 A1 | 6/2010 | Ladouceur et al. |
| 2010/0172081 A1 | 7/2010 | Tian et al. |
| 2010/0195279 A1 | 8/2010 | Michael |
| 2010/0294909 A1 | 11/2010 | Hauser et al. |
| 2011/0199727 A1 | 8/2011 | Probst |
| 2011/0222238 A1 | 9/2011 | Staats et al. |
| 2011/0267757 A1 | 11/2011 | Probst |
| 2012/0008269 A1 | 1/2012 | Gengler |
| 2012/0008299 A1 | 1/2012 | Gengler |
| 2012/0009000 A1 | 1/2012 | Starrett |
| 2012/0012483 A1 | 1/2012 | Fan |
| 2012/0074271 A1 | 3/2012 | Goetz |
| 2012/0106059 A1 | 5/2012 | Probst et al. |
| 2012/0106060 A1 | 5/2012 | Probst |
| 2012/0106061 A1 | 5/2012 | Probst et al. |
| 2012/0106062 A1 | 5/2012 | Probst et al. |
| 2012/0106078 A1 | 5/2012 | Probst et al. |
| 2012/0114198 A1 | 5/2012 | Yang et al. |
| 2012/0140396 A1 | 6/2012 | Zeliff et al. |
| 2012/0170198 A1 | 7/2012 | Wu et al. |
| 2012/0188697 A1 | 7/2012 | Cheng et al. |
| 2012/0194448 A1 | 8/2012 | Rothkopf |
| 2012/0243149 A1 | 9/2012 | Gartrell et al. |
| 2012/0293953 A1 | 11/2012 | Wu et al. |
| 2012/0327580 A1 | 12/2012 | Gengler |
| 2012/0327594 A1 | 12/2012 | Gengler |
| 2013/0088431 A1 | 4/2013 | Ballagas et al. |
| 2013/0134061 A1 | 5/2013 | Wu et al. |
| 2013/0170126 A1 | 7/2013 | Lee |

(56) References Cited

U.S. PATENT DOCUMENTS

| | | | |
|---|---|---|---|
| 2013/0229354 | A1 | 9/2013 | Whitt et al. |
| 2013/0229773 | A1 | 9/2013 | Siddiqui et al. |
| 2013/0242490 | A1 | 9/2013 | Ku |
| 2013/0242492 | A1 | 9/2013 | Griffin et al. |
| 2013/0279096 | A1 | 10/2013 | Gengler |
| 2013/0301205 | A1 | 11/2013 | Fyke |
| 2014/0043743 | A1 | 2/2014 | Liang |
| 2014/0055920 | A1 | 2/2014 | Liang |
| 2014/0071654 | A1 | 3/2014 | Chien et al. |
| 2014/0132550 | A1* | 5/2014 | McCracken .......... G06F 1/1684 345/173 |

OTHER PUBLICATIONS

Eee Pad Transformer TF101; http://www.asus.com/Tablets_Mobile/Eee_Pad_Transformer_TF101 accessed Apr. 12, 2013.

Brydge; http://thebrydge.com/ accessed Apr. 12, 2013.

Lenovo Ideapad U1 Hybrid Notebook; http://uncrate.com/stuff/lenovo-ideapad-u1-hybrid-notebook/ accessed Apr. 12, 2013.

ClamCase® iPad Keyboard Cases & Stands; http://clamcase.com/ accessed Apr. 12, 2013.

iPad Keyboards, Cases, & Stands; ZAGGkeys PROplus iPad Keyboard; http://www.zagg.com/keyboard-cases/index.php accessed Apr. 12, 2013.

iPad Keyboards, Cases, & Stands; ZAGGkeys PROfolio; ZAGG Keyboards & Cases; http://www.zag.com/keyboard-cases/index.php accessed Apr. 12, 2013.

iPad Keyboards, Cases, & Stands; ZAGGkeys PROfolio +; ZAGG Keyboards & Cases; http://www.zagg.com/keyboard-cases/index.php accessed Apr. 12, 2013.

iPad Keyboards, Cases, & Stands; ZAGGkeys Pro; ZAGG Keyboards & Cases; http://www.zaag.com/keyboard-cases/index.php accessed Apr. 12, 2013.

iPad Keyboards, Cases, & Stands; Logitech Keyboard Case for iPad 3 & 4; ZAGG Keyboards & Cases; http://www.zagg.com/keyboard-cases/index.php accessed Apr. 12, 2013.

iPad Keyboards, Cases, & Stands; ZAGGkeys FLEX; ZAGG Keyboards & Cases http://www.zagg.com/keyboard-cases/index.php accessed Apr. 12, 2013.

Ultrathin Keyboard Cover for iPad—Logitech; Ultrathin Keyboard Cover; http://www.logitech.com/en-us/product/ultrathin-keyboard-cover accessed Apr. 12, 2013.

CruxSKUNK—CruxCase; http://www.cruxcase.com/products/cruxskunk/ accessed Apr. 12, 2013.

CruxFLIP—CruxCase; http://www.cruxcase.com/products/cruxflip-3/ accessed Apr. 12, 2013.

Crux360—CruxCase; http://www.cruxcase.com/products/crux360-for-ipad-3 accessed Apr. 12, 2013.

Kickstarter; Brydge + iPad: Do more. By Brad Leong; http://www.kickstarter.com/projects/552506690/brydge-ipad-do-more?play=1&ref=search accessed Apr. 15, 2013.

'Big Blue'-Tooth™ Keyboards & LARGEKeys Keybords; http://ricooper.com/big-blue-tooth-keyboard/index.html; accessed Nov. 20, 2013; 5 pages.

Belkin, Portable Keyboard Case for iPad mini; www.belkinbusiness.com/products; accessed Nov. 20, 2013; 1 page.

Belkin; Portable Keyboard Case for 7" Tablets; www.belkinbusinee.com/products/; accessed Nov. 20, 2013; 2 pages.

Cooper Infinite Universal 8"-10" Tablet Folio; www.tablet2cases.com/cooper-infinite-universal-8-10-tablet-folio; accessed Nov. 20, 2013; 8 pages.

The gadgeteer; *ZAGG introduces a Universal Bluetooth Keyboard*—thegadgeteer.com/2013/07/23/zagg-introducesa-universal-bluetooth-keyboard/; accessed Nov. 20, 2013; 7 pages.

ThinkPad Helix; Tablet Laptop Hybrid. ThinkPad Helix Ultrabook Laptop; Lenovo; accessed Nov. 20, 2013; 2 pages.

Tmart; Black Friday; 6-8 Universal Tablet PC Leather Case Coverwith Plug-in Card Yellow—Tmart.com; accessed Nov. 20, 2013; 3 pages.

Wholesale—7 inch 8 inch 9 inch 10 inch 10.1 inch tablet case folio PU leather adjustable case cover sheath; http://www.dhgate.com/product/7-inch-8-inch-9inch-9-7inch-10-inch-10-1; 1 page.

Wholesale—DHL Freeshipping 10" 10.1" Inch Tablet PC USB Keyboard Cover Leather Case for 10" 10.1" 10.@" MID Tablet Best Gift for Christmas; accessed Nov. 20, 2013; 1 page.

Wholesale—Hot PU Leather Case Cover Holder with Wireless Bluetooth Keyboard Keypad for iPad Mini with StandFunction Green Free Shipping; hhttp://image.dhgate.com/albu_367587927_00-1.Ox0/hot-pu-leather-case-cover-holder-with-wireless; accessed Nov. 20, 2013; 1 page.

Logitech Ultra Thin Folio, Wireless Keyboard and Folio Case, 3 pages, accessed Nov. 6, 2014.

Griffin Folio, Wireless Keyboard and Folio Case, 2 pages, accessed Nov. 10, 2014.

Kensington Key Folio, Pro 2 Universal Removable Keyboard Case and Stand for 10" Tablets, 3 pages, accessed Nov. 10, 2014.

Stern, Joanna; Lenovo IdeaPad U1 Hybrid: laptop by day, unhinged tablet by night; Jan. 4, 2010; 1 page.

Stein; "Lenovo meshes tablet and Netbook in one device with IdeaPad U1 Hybrid Notebook"; Jan. 4, 2010; 3 pages.

Stern; "Lenovo IdeaPad U1 Hybrid hands-on and impressions"; Jan. 5, 2010; 4 pages.

Sutter; "What is a tablet, anyway?"; Jan. 9, 2010; 3 pages.

Herrman; "Always Innovating Half-Netbook, Half-Tablet Ships in Jul., Still $300"; Jun. 25, 2009; 2 pages.

Miller; "The Dawn of the Tablet PC: CES 2010 Roundup"; Jan. 7, 2010 ; 2 pages.

* cited by examiner

KEYBOARD FOLIO WITH ATTACHMENT STRIP

PRIORITY CLAIM(S) and RELATED APPLICATION(S)

Priority is claimed to U.S. Provisional Patent Application Ser. No. 62/275,156, filed Jan. 5, 2016, which is hereby incorporated herein by reference in its entirety.

This is related to U.S. patent application Ser. No. 15/150,565, filed May 10, 2016, entitled "Friction Resistance Hinge with Auto-Lock"; which is hereby incorporated herein by reference in its entirety.

BACKGROUND

Field of the Invention

The present invention relates generally to keyboard folios for providing a wireless keyboard to a tablet computer.

Related Art

Tablet computers or tablets, such as the Apple® iPad® tablet computer, have grown in popularity. Such tablet computers are often thin, rectilinear computers with a broad touch screen that can offer media viewing and user input through a graphical keyboard. Such tablet computers can also have a patterned magnet array to magnetically attach to a cover.

Tablet computers risk damage from dropping because their small size and light weight promote mobility and holding. Often, the tablet computer has a slim, streamline case that is aesthetically pleasing but difficult to grasp and hold. User's often supplement the tablet computer with a case or folio to protect the screen and the tablet computer. Such cases or folios can often enclose or envelope the back, edges, and front perimeter of the tablet computer. Other cases can grip or pinch the tablet computer.

Typing or keyed entry on the tablet computers can be difficult due to the lack of haptic or tactile response of the graphical keyboard, and the large amount of space required by the graphical keyboard leaves a small viewing area. User's often supplement the tablet computer with a wireless keyboard to facilitate typing or keyed entry. Such wireless keyboards can also be incorporated into the case or folio. Again, such cases or folios can often enclose or envelope the back, edges, and front perimeter of the tablet computer. Alternatively, such keyboards can have a tray to receive the tablet computer thereon.

Some cases or folios can maintain a viewing angle of the tablet by a hinge between the case and the keyboard. Other keyboards or cases have a complicated folding geometry.

SUMMARY OF THE INVENTION

It has been recognized that it would be advantageous to develop a case or folio for a tablet with a wireless keyboard that can be oriented at an ergonomic angle or incline during use. In addition, it has been recognized that it would be advantageous to develop a case or folio for a tablet with a kickstand to maintain a viewing angle of the tablet. Furthermore, it has been recognized that it would be advantageous to develop a case or folio for a tablet that can maintain the ergonomic angle or incline of the wireless keyboard independent of the tablet and kickstand.

The invention provides a keyboard folio for a tablet computer. The keyboard folio comprises a shell with a cavity sized and shaped to receive the tablet computer. The shell has an attachment strip along a side thereof. The attachment strip has ferromagnetic elements therein. A wireless keyboard is magnetically coupled to the shell. The wireless keyboard has an attachment bar with ferromagnetic elements magnetically couplable to the ferromagnetic elements of the attachment strip of the shell. The wireless keyboard and the shell have two configurations, including: 1) an attached configuration in which the wireless keyboard is magnetically coupled to the shell with the ferromagnetic elements of the attachment bar of the wireless keyboard magnetically coupled to the ferromagnetic elements of the attachment strip of the shell, and 2) a detached configuration in which the wireless keyboard is separated from the shell. The wireless keyboard has a keyboard panel with an alphanumeric keyboard pivotally coupled to the attachment bar. A keyboard hinge pivotally couples the keyboard panel to the attachment bar. The attachment bar of the wireless keyboard magnetically and removably attaches to the attachment strip of the shell in a fixed relationship. The keyboard panel pivots with respect to the attachment bar, and thus the shell, between: 1) a closed orientation in which the keyboard panel is against the shell, and 2) an open orientation in which the keyboard panel is at an obtuse angle with respect to the shell and the attachment bar, and with the keyboard panel inclined at an acute angle with respect to horizontal, and with the attachment bar of the wireless keyboard remaining in the fixed relationship with the shell.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
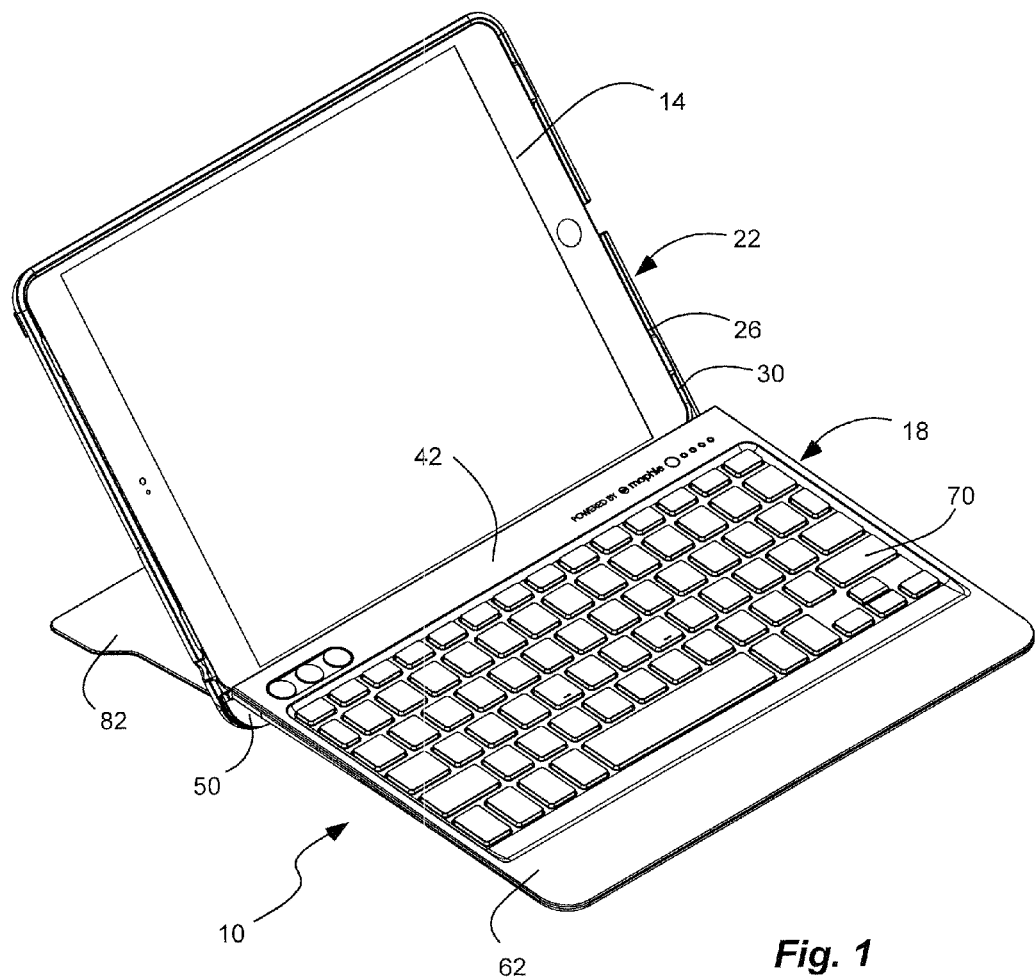
FIG. 1 is a perspective view of a keyboard folio in accordance with an embodiment of the present invention, shown with a tablet computer received in a shell, and showing the wireless keyboard in an attached configuration magnetically coupled to the shell, and showing a keyboard panel of the wireless keyboard in an open orientation at an obtuse angle with respect to the shell, and with the keyboard panel inclined at an acute angle with respect to horizontal, and showing the keyboard panel in an inclined orientation in which an attachment bar is disposed under the keyboard panel to incline the keyboard panel with respect to horizontal, and showing a kickstand in a deployed orientation at an acute angle with respect to the shell, and parallel with a support surface.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch, such as finger swipes, and/or can have a virtual keyboard. The tablet can have a battery and memory and a processor with software running thereon. The tablet can have WiFi and Bluetooth connectivity, and can have a wireless transmitter, receiver, or transceiver. Thus, the tablet can provide internet browsing, game playing, movie and picture display, e-book display, etc. In addition, the tablet can include a digital camera. Furthermore, the terms tablet computer and tablet are used broadly herein to refer to cellular or cell phones (or smart phones) and phablets, which also provide similar computing capabilities, battery power, memory, processor, software, WiFi and Bluetooth connectivity, transceiver, touch screen display, digital camera, etc. Examples of cell phones and phablets include the Apple iPhone, the Samsung Galaxy S phone series, the Samsung Note 3 phablet, HTC One Max, Nokia Lumina 1520, etc.

The term "computer" is used herein to refer to a tablet computer or tablet, as described above, as well as other computing devices or platforms without an integrated keyboard. Such a computer can be battery operated.

The term "computing device" is used herein to refer to a computer, desktop computer, laptop computer, tablet or tablet computer, phablet, or cellular or cell phone with a display screen. The display screen can be a touch screen that can receive input by touch such as finger swipes, and/or can have a virtual keyboard. The computing device can have memory and a processor with software running thereon. The computing device can have cellular, WiFi and/or Bluetooth connectivity. Thus, the computing device can provide internet browsing, game playing, movie and picture display, e-book display, etc. The display screen can display content or alphanumeric characters typed on the keyboard.

The term "keyboard" refers to an array or matrix of alphanumeric (both alphabetical and/or numeric) or character keys, modifier keys for altering the functions of other keys, navigation keys for moving the text cursor on a display, function keys and/or system command keys. The keyboard can have a keyboard layout with keys arranged in an acceptable format or standard, such as the QWERTY layout. The keyboard layout can include three rows of characters or letters, a row of numbers above the characters, and one or two rows of other keys, such as a space bar, modifier keys, function keys, navigations keys, etc., for a total of five or six rows. Most of the keys can be square or rectilinear buttons of the same size and shape. In addition, the keys can be buttons capable of registering contact, pressure or force from a user's fingers. The keys or buttons can use any appropriate switch technology, including for example, membrane, dome-switch, scissor-switch, capacitive, mechanical-switch, buckle spring, Hall effect, laser, optical, etc. The keys, buttons and/or switches can provide a feedback response and can have a travel distance. Furthermore, the keyboard can be part of, or can itself form, a leaf or a panel that can be removably coupled to a tablet, and that can form a cover for a tablet. In use, the keyboard can be physically, but not electrically coupled to the tablet; or can be remote from the tablet. When not in use, the keyboard can be physically, but not electrically, coupled to the tablet. In addition, the keyboard or cover can include battery power, a wireless transmitter, receiver, or transceiver, a memory, a processor, and software. In one aspect, the keyboard can include WiFi and Bluetooth connectivity. In another aspect, the keyboard can include a physical and electrical connection. Thus, they keyboard can have both a physical and a communication connection with the tablet.

The term "ferromagnetic" is used herein to refer to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic button is a magnet or is magnetic, such as a permanent magnet, or is attracted to magnets, such as by containing iron.

DESCRIPTION

The invention provides a keyboard folio for a tablet computer. The folio comprises a wireless keyboard removably coupled to a shell. The shell carries the tablet computer and has a kickstand to orient the shell, and thus the tablet computer. The shell has an attachment strip along a side thereof (such as the bottom side) that faces forwardly and that is flush with an opening in the shell (and parallel with the opening and the tablet computer), and can be wider than the remainder of the perimeter of the shell. The wireless keyboard attaches to the attachment strip of the shell, and thus the front of the shell. The attachment strip positions the attachment of the wireless keyboard to front of the shell, freeing the edge of the tablet computer and the edge of the shell. In addition, the attachment strip displaces the attachment of the wireless keyboard away from the opening of the shell, and thus away from a display of the tablet computer so that the view is unobstructed. Furthermore, the attachment strip elevates the wireless keyboard (or keyboard panel thereof) into an inclined orientation that can be more ergonomic. The wireless keyboard has a keyboard panel flexibly and pivotally coupled to an attachment bar (which removably coupled the keyboard panel to the attachment strip of the shell). A flexible hinge couples the keyboard panel and the attachment bar. The flexible hinge allows the attachment bar to pivot under the keyboard panel to maintain the inclined orientation, even when the wireless keyboard is detached from the shell, and thus the tablet computer. Thus, the incline of the keyboard panel is independent of the orientation or the shell or even attachment of the wireless keyboard to the shell. The kickstand is coupled to the shell near the attachment strip. The keyboard panel and wireless keyboard can include two or more buttons to selectively change the wireless connection of the keyboard to different computing devices.

As illustrated in FIGS. 1-10*b*, a keyboard folio, indicated generally at 10, in an example implementation in accordance with the invention is shown for use with a tablet computer or tablet 14. The keyboard folio 10 comprises a wireless keyboard 18 pivotally and removably coupled to a shell 22. The shell 22 has a cavity 26 sized and shaped to receive the tablet computer 14. The shell 22 has a front with an opening 30 to the cavity 26, and an opposite back. The opening 30 is sized to receive the tablet 14 therethrough and to retain the tablet in the cavity. The opening can define a front of the shell. In addition, the shell 22 has a side defining a bottom edge 34 when disposed upon a support surface 38. Furthermore, the shell 22 has an attachment strip 42 along a side thereof (or the bottom edge). The attachment strip can extend along an entire length, or substantially the entire length, of the shell. In addition, the attachment strip can form a portion of a perimeter of the shell, and a perimeter of the opening to the cavity. The attachment strip 42 can define the bottom edge 34 of the shell. The attachment strip 42 has a front face 44 (extending along the attachment strip) that faces forwardly, along with the shell, and that is substantially flush with or parallel with the opening 30 to the cavity 26 of the shell. In addition, the front face is parallel with the tablet or display thereof. The front face 44 of the attachment strip 42, and the attachment strip 42, can be wider than another portion of the perimeter, or remaining portion of the perimeter, of the shell that circumscribes the opening to the cavity of the shell. In addition, the front face of the attachment strip and the attachment strip can be wider than a thickness of the shell. The front face 44 of the attachment strip 42 of the shell 22 leaves the opening 30 to the cavity 26 exposed, and thus exposes a surface of the tablet computer 14 (even while the keyboard or the attachment bar thereof is attached to the front of the shell). The shell can be formed of plastic and can be formed by injection molding. The shell can be relatively stiff or rigid, with some flexibility so that the perimeter around the opening can expand to receive the tablet therethrough, and resilient so that perimeter can contract to hold the tablet. The attachment strip 42 has ferromagnetic elements 46 therein. The ferromagnetic elements can be embedded in the attachment strip.

As described above, the wireless keyboard 18 is coupled to the shell 22, both pivotally and releasably or detachably. In addition, the wireless keyboard 18 is coupled to a front of the shell. The wireless keyboard 18 is magnetically coupled to the shell 22 so that the wireless keyboard 18 can be selectively attached and detached from the shell, and thus the tablet 14. The wireless keyboard 18 has an attachment bar 50 releasably coupled to the attachment strip 42 of the shell 22. The attachment bar 50 of the wireless keyboard 18 has an attachment face 54 (extending along the attachment bar). The attachment face 54 of the attachment bar 50 of the wireless keyboard 18 abuts to the front face 44 of the attachment strip 42 of the shell 22 when the wireless keyboard is magnetically coupled to the shell. The attachment bar 50 of the wireless keyboard 18 is attached to the front of the shell 22. The attachment bar 50 can be formed of plastic, and can be formed by injection molding. The attachment bar 50 has ferromagnetic elements 58 magnetically couplable to the ferromagnetic elements 46 of the attachment strip 42 of the shell 22. The ferromagnetic elements can be embedded in the attachment strip.

The wireless keyboard 18 and the shell 22 have at least two configurations, including: an attached configuration, and a detached configuration. In the attached configuration, as shown in FIGS. 1, 2, 5 and 6, the wireless keyboard 18 is magnetically coupled to the shell 22, with the ferromagnetic elements 58 of the attachment bar 50 of the wireless keyboard 18 magnetically coupled to the ferromagnetic elements 46 of the attachment strip 42 of the shell 22. In the detached configuration, as shown in FIGS. 3*a*, 3*b* and 7-9, the wireless keyboard 18 is physically separated from the shell 22, with the ferromagnetic elements 58 of the attachment bar 50 of the wireless keyboard 18 detached from the ferromagnetic elements 46 of the attachment strip 42 of the shell 22.

In addition, the wireless keyboard 18 also has a keyboard panel 62 pivotally coupled to the attachment bar 50 by a keyboard hinge 66. The keyboard hinge 66 can be a flexible hinge pivotally and/or flexible coupling the keyboard panel and the attachment bar together. In one aspect, the keyboard hinge or the flexible hinge can be or can comprise a strip of silicone. The flexible hinge 66 can be free of electrical connections between the keyboard panel and the attachment bar. The keyboard panel 62 has an alphanumeric keyboard 70. The keyboard panel 62 can have a housing containing and/or carrying components of the wireless keyboard, such as a processor, a digital memory device, a transceiver, and a battery, as described below. The housing can be formed of plastic, and can be formed by injection molding.

Figure 2:
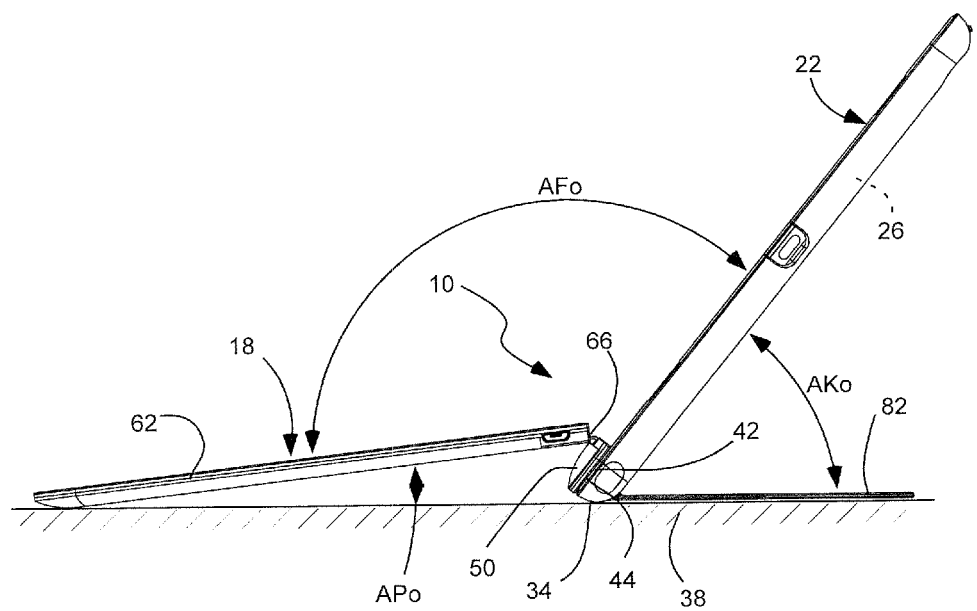
FIG. 2 is a side view of the keyboard folio of FIG. 1, again shown with the wireless keyboard in the attached configuration, the keyboard panel in the open orientation and the inclined orientation, and the kickstand in the deployed orientation.
Figure 6:
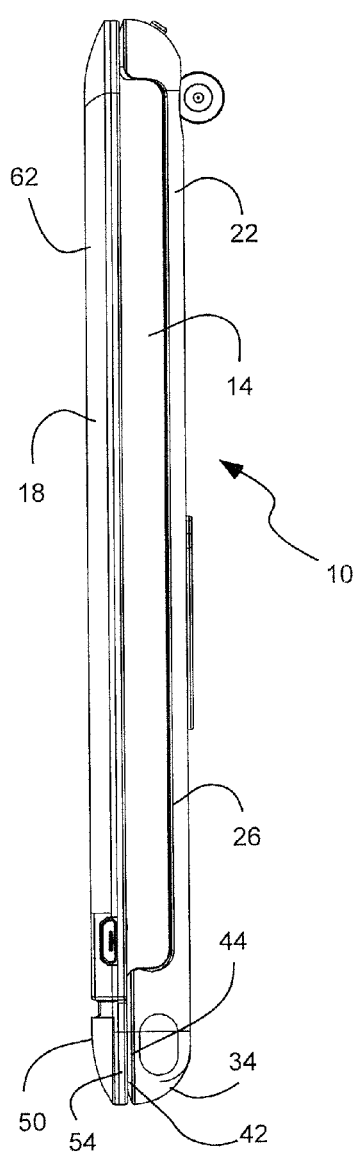
FIG. 6 is a side view of the keyboard folio of FIG. 1 showing the wireless keyboard in the attached configuration, and showing the wireless keyboard in a closed orientation against the shell, and showing the keyboard panel in the flat configuration, and showing the kickstand in the retracted orientation.
Figure 7:
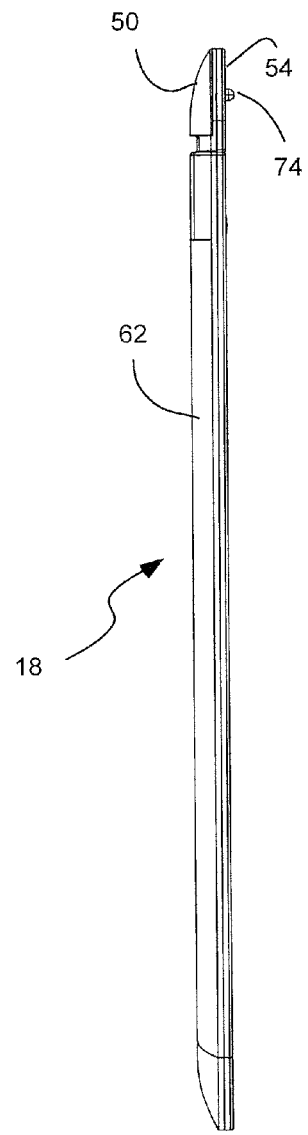
FIG. 7 is a side view of the wireless keyboard of the keyboard folio of FIG. 1 showing the wireless keyboard in the detached configuration, and showing the keyboard panel in the flat orientation.
Figure 5:
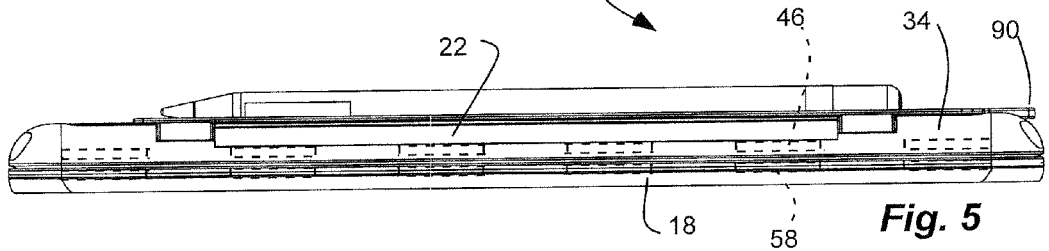
FIG. 5 is a bottom view of the keyboard folio of FIG. 1 showing the wireless keyboard in the attached configuration, and showing the kickstand in the retracted orientation.
Figure 8:
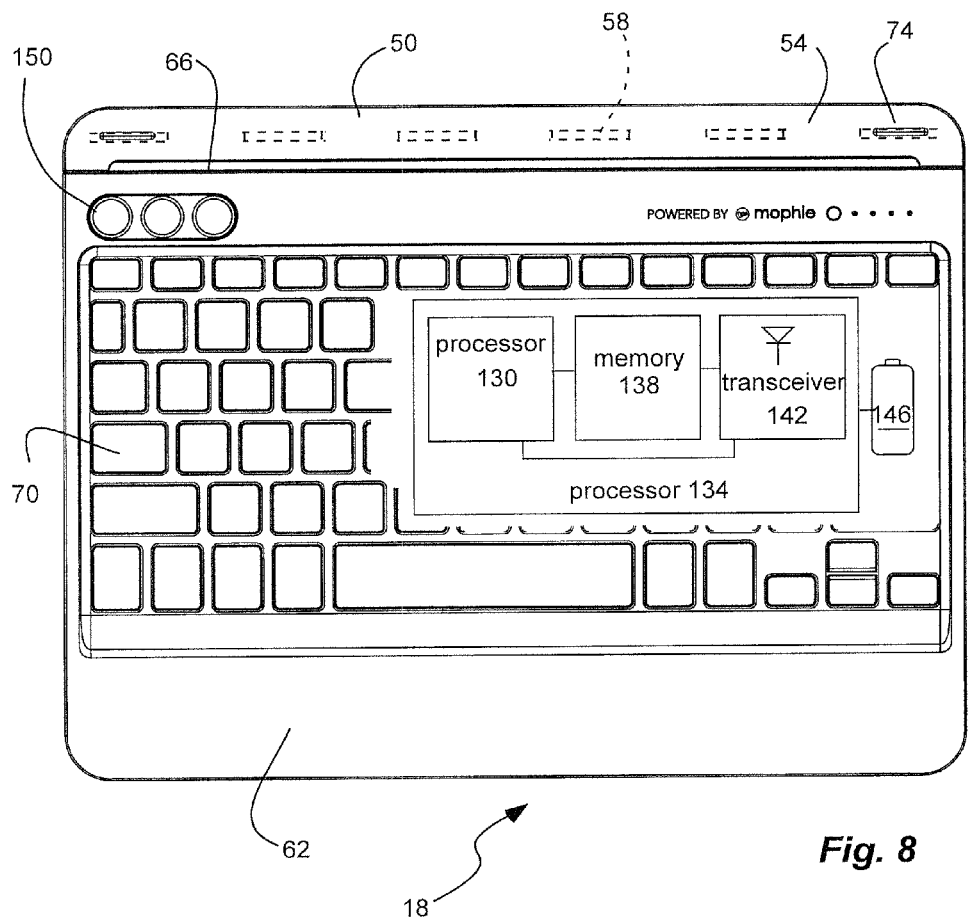
FIG. 8 is a top view of the wireless keyboard of the keyboard folio of FIG. 1 showing the wireless keyboard in the detached configuration, and showing the keyboard panel in the flat orientation.
Figure 9:
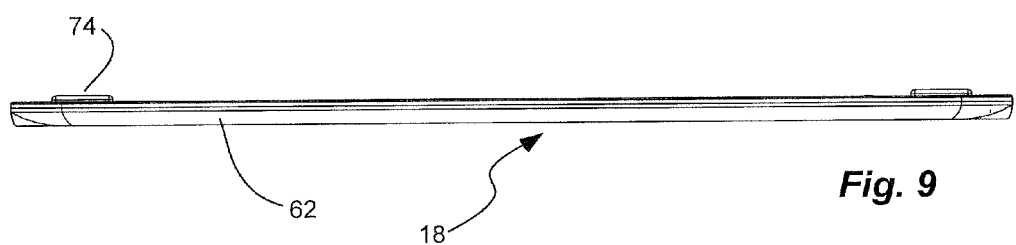
FIG. 9 is a front view of the wireless keyboard of the keyboard folio of FIG. 1 showing the wireless keyboard in the detached configuration, and showing the keyboard panel in the flat orientation.
Figure 10A:
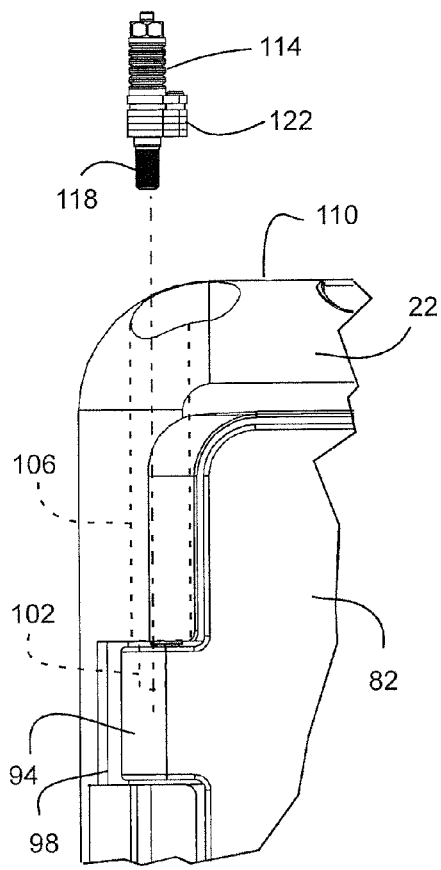
FIG. 10a is a partial rear view of the keyboard folio of FIG. 1 showing a friction hinge being installed.
Figure 10B:
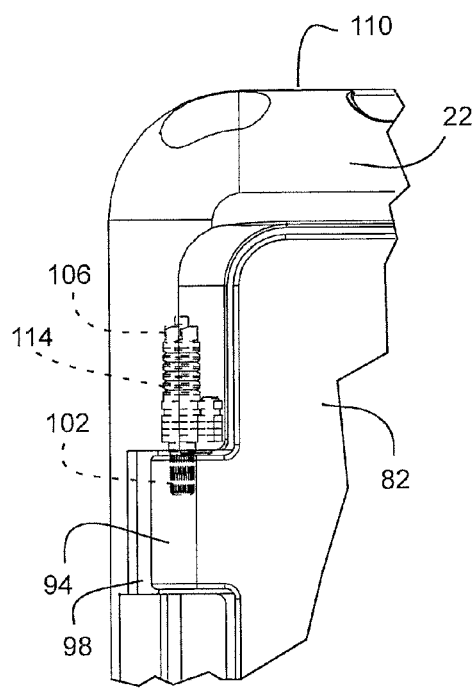
FIG. 10b is a partial rear view of the keyboard folio of FIG. 1 shown with the friction hinge installed.
Figure 11:
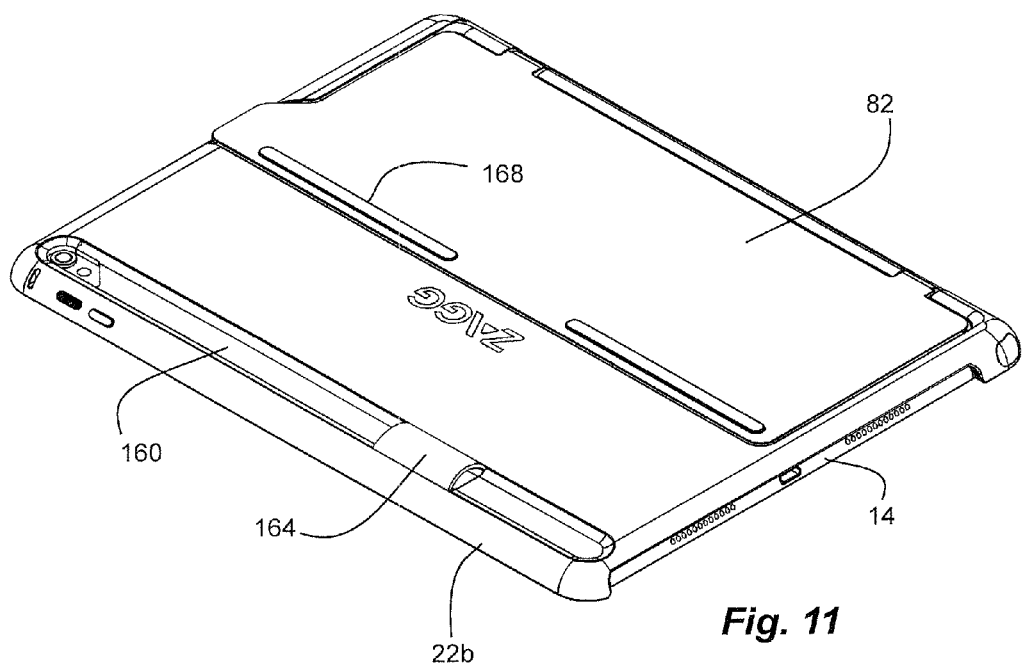
FIG. 11 is a perspective view of another shell of another wireless keyboard in accordance with another embodiment of the invention, showing wireless keyboard in the detached configuration separated from the shell.
Figure 12:
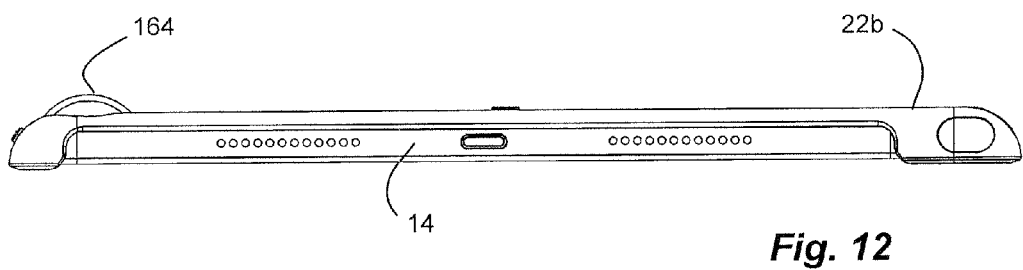
FIG. 12 is a side view of the shell of FIG. 11, showing wireless keyboard in the detached configuration separated from the shell.
Figure 13:
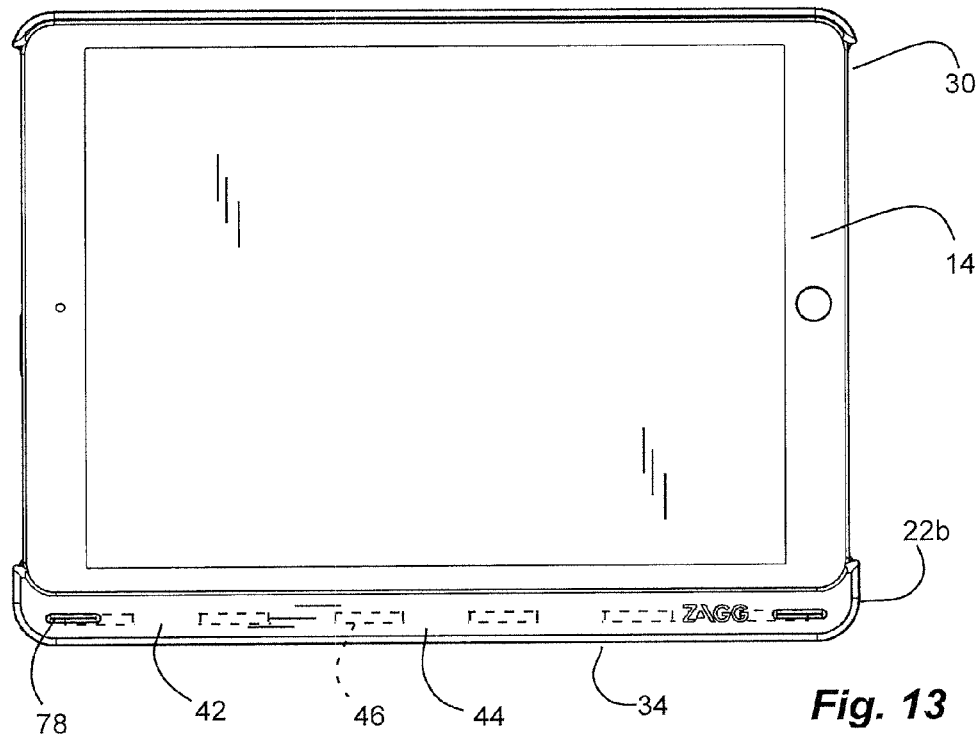
FIG. 13 is a is a front view of the shell of FIG. 11 showing the tablet computer therein, and the showing wireless keyboard in the detached configuration separated from the shell.
Figure 14:
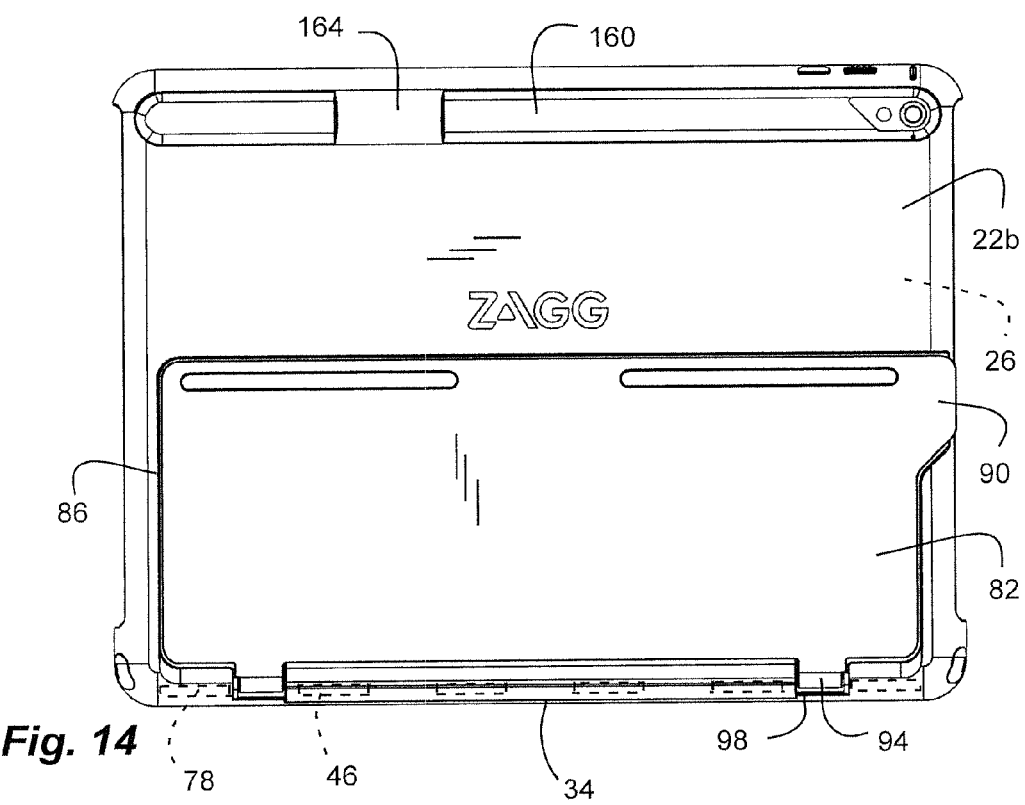
FIG. 14 is a rear view of the shell of FIG. 11 showing the kickstand in a retracted orientation adjacent the shell.

As described above, the attachment bar 50 of the wireless keyboard 18 is magnetically and removably attached to the attachment strip 42 of the shell 22, and in a fixed relationship without moving with respect to the attachment strip and shell when magnetically attached. The keyboard panel 62, however, pivots with respect to the attachment bar 50, and thus the shell 20. The keyboard panel 62 can pivot between at least two orientation, including: a closed orientation and an open orientation. In the closed orientation, as shown in FIGS. 5 and 6, the keyboard panel 62 is against the shell 22, and extends across the opening of the shell, and thus the tablet to protect a front or display of the tablet. In the open orientation, as shown in FIGS. 1 and 2, the keyboard panel 62 is at an obtuse angle AFo with respect to the shell 22. In addition, the keyboard panel 62 is inclined at an acute angle Apo with respect to horizontal (and the support surface). Furthermore, the attachment bar 50 of the wireless keyboard 18 can remain in the fixed relationship with the shell.

Figure 3A:
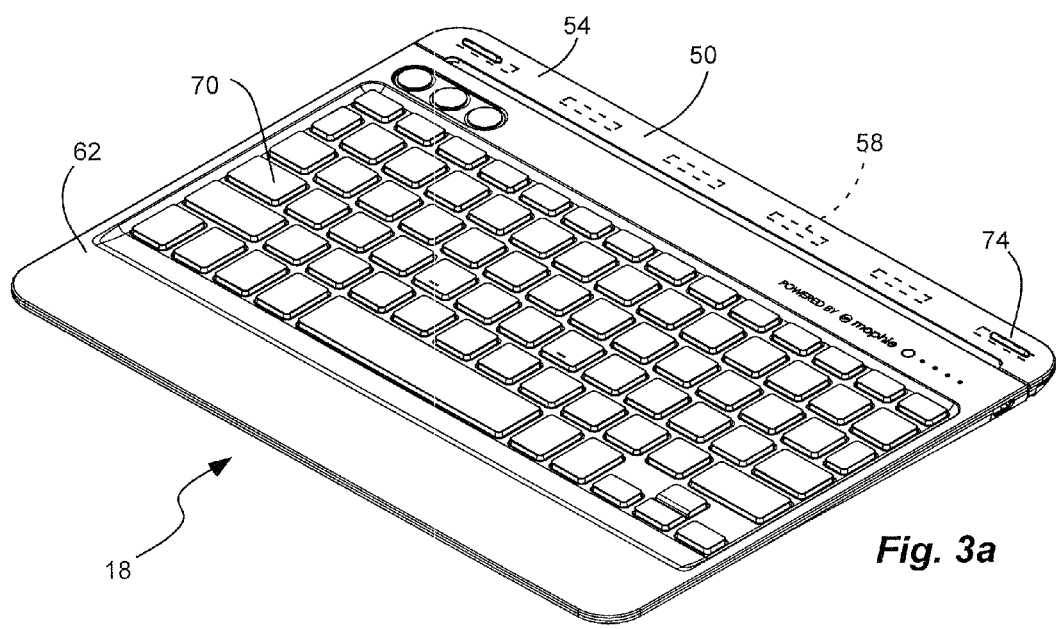
FIG. 3a is a perspective view of the wireless keyboard of the keyboard folio of FIG. 1 showing the wireless keyboard in a detached configuration separated from the shell, and showing the keyboard panel in a flat configuration in a common planar layer defined by the keyboard panel along with the attachment bar.
Figure 3B:
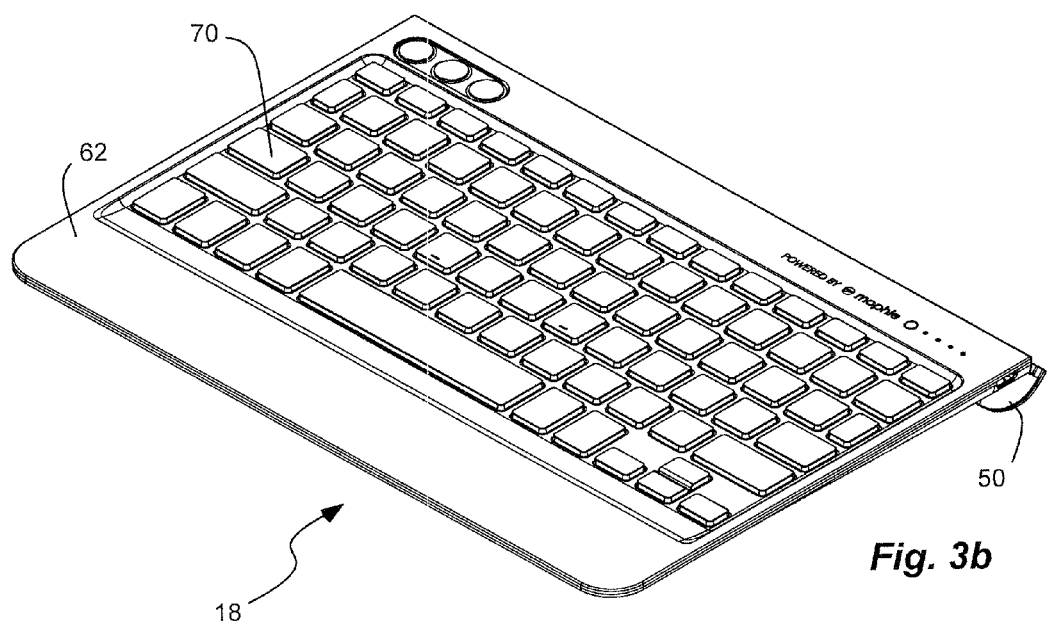
FIG. 3b is a perspective view of the wireless keyboard of the keyboard folio of FIG. 1 showing the wireless keyboard in the detached configuration, and showing the keyboard panel in the inclined orientation.

The keyboard panel 62 and the attachment bar 50 have at least two configurations, including: a flat configuration, and an inclined orientation. In the flat configuration, as shown in FIGS. 3a and 6-9, the keyboard panel 62 and the attachment bar 50 are in a common planar layer, defined by the keyboard panel. The keyboard panel and the attachment bar can be in the flat orientation while the keyboard panel 62 is in the closed orientation with respect to the shell. In the inclined orientation, as shown in FIGS. 1, 2 and 3b, the attachment bar 50 is rotated at least 90 degrees from the flat configuration, and is disposed under the keyboard panel 62 to incline the keyboard panel with respect to horizontal. In one aspect, the keyboard panel and the attachment bar can be in the inclined orientation while the wireless keyboard and the shell are in the attached configuration, as shown in FIGS. 1 and 2. In another aspect, the keyboard panel and the attachment bar can remain in the inclined orientation while the wireless keyboard and the shell are in the detached configuration, as shown in FIG. 3b. Thus, the inclined orientation of the keyboard panel can remain in an ergonomic position even when the wireless keyboard is separated from the shell. The orientation of the keyboard panel in the inclined orientation is independent of the shell (and the kickstand thereof). In addition, the wireless keyboard 18 is capable of independent operation with respect to the shell 22, and is capable of wirelessly connecting to the tablet computer in the detached configuration, and capable of maintaining the inclined configuration in the detached configuration with the attachment bar under the keyboard panel.

Figure 4A:
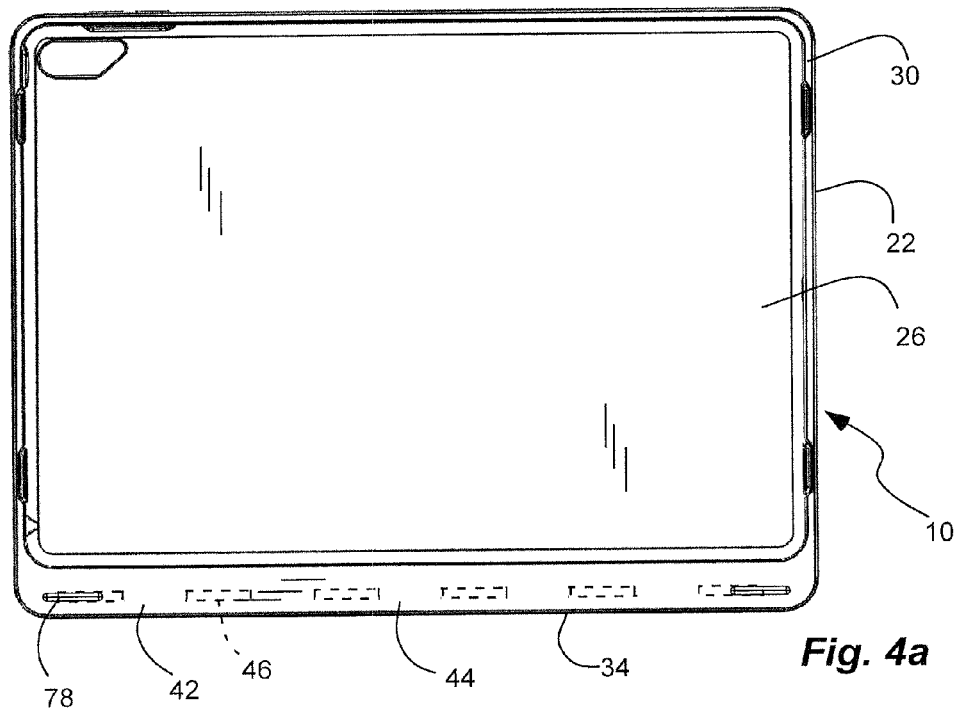
FIG. 4a is a front view of the shell of the keyboard folio of FIG. 1 showing the tablet computer removed from the shell, and the showing wireless keyboard in the detached configuration separated from the shell.
Figure 4B:
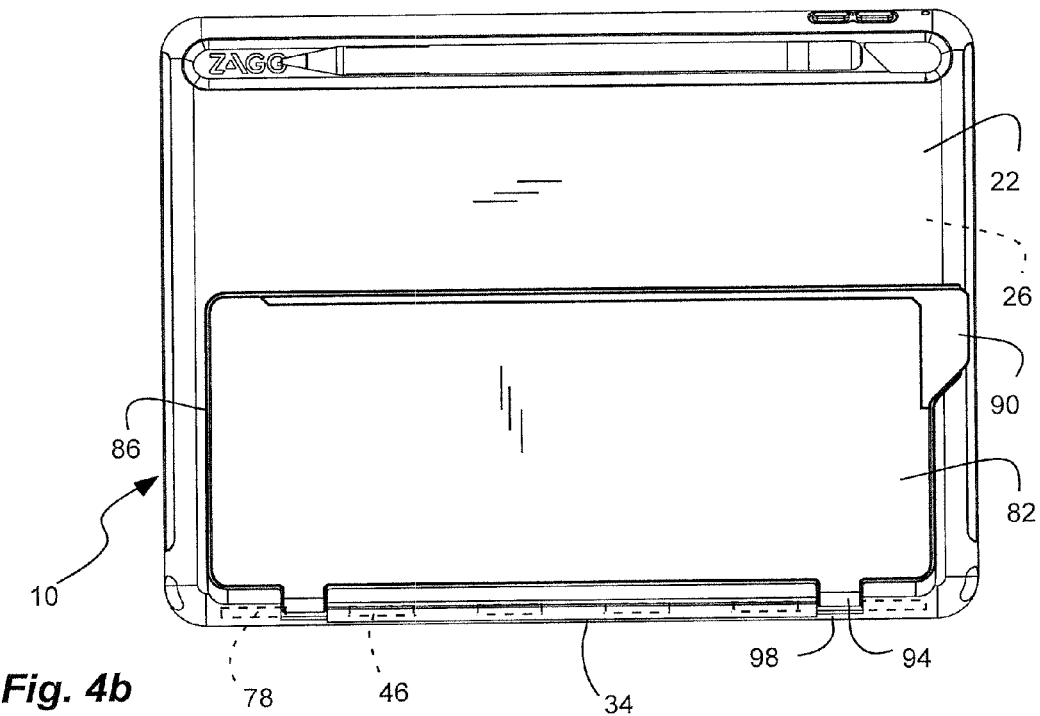
FIG. 4b is a rear view of the shell of the keyboard folio of FIG. 1 showing the kickstand in a retracted orientation adjacent the shell.

The folio 10 can also comprise an alignment structure between the wireless keyboard 18 and the shell 22. A protrusion 74 extends from one of the attachment strip or the attachment bar (such as the attachment bar 50 as shown in FIG. 3a), and into a matching indentation 78 in another of the attachment strip or the attachment bar (such as the attachment strip 42 as shown in FIG. 4). The attachment structure can resist lateral shifts or sliding between the attachment bar and the attachment strip, and thus between the wireless keyboard and the shell.

The folio 10 and/or the shell 22 can also comprise a kickstand 82 pivotally coupled to the shell 22 near or at the attachment strip 42 of the shell, and near or at the bottom edge of the shell. Thus, the kickstand can be pivotally coupled to the bottom edge of the shell. The kickstand 82 pivots with respect to the shell 22 between: a retracted orientation, and multiple deployed orientations. In the retracted orientation, as shown in FIG. 4, the kickstand is adjacent the shell. In one aspect, the shell 22 can have an indentation 86 in a back side of the shell sized and shaped to receive the kickstand therein in the retracted orientation. The kickstand and the indentation can extend a majority of a width of the shell. In another aspect, the kickstand can comprise a tab 90 extending from the flap, the indentation, and/or a perimeter or side of the shell to be engaged by a user's finger. In the deployed orientation, as shown FIGS. 1 and 2, the kickstand 82 is at an acute angle AKo with respect to the shell 22. The kickstand having a plurality of different deployed orientations in which the kickstand forms different acute angles with respect to the shell. In addition, the kickstand can be disposed on and parallel with the support surface 38, because the kickstand is pivotally coupled to the bottom edge of the shell. The kickstand 82 can be formed of a planar metallic flap, and can have a silicon bead extending around a majority of a perimeter edge of the flap.

The kickstand 82 can have a lobe 94 extending into a notch 98 in the shell 22. The lobe 94 can have a bore 102 therein with a cross-sectional shape. The shell 22 can have a slot 106 with a cross-sectional shape different than the cross-sectional shape of the bore of the lobe. The slot 106 can extend from a perimeter side 110 of the shell to the notch 98. The slot 106 of the shell 22 can be aligned with the bore 102 of the lobe 94 of the kickstand 82.

A resistance hinge 114 is coupled between the lobe 94 of the kickstand 82 and the shell 22. The hinge 114 has a head 118 with a cross-sectional shape mating with the cross-sectional shape of the bore 102 so that the head is fixedly retained within the bore and with respect to the kickstand 82. The hinge 114 also has a key 122 rotatable with respect to the head 118 and having a cross-sectional shape mating with the cross-sectional shape of the slot 106 so that the key is fixedly retained within the slot and with respect to the shell 22. The slot 106 is aligned with the bore 102 allows for installation of the resistance hinge 114. A cross-sectional size of the slot 106 is larger than a cross-sectional size of the bore 102 so that the hinge 114 is capable of being inserted into the slot through the perimeter side 110 of the shell 22 until the head 118 is retained in the bore 102 of the lobe 94 of the kickstand 82, and the key 122 is retained in the slot 106 of the shell 22. In addition, the slot can extend into the attachment strip of the shell, with the attachment strip providing additional thickness or volume within the shell to receive the slot, and thus the resistance hinge.

As described above, they wireless keyboard 10 and the keyboard panel 62 can comprise a processor 130 or 134 coupled to the alphanumeric keyboard 70, a digital memory device 138, a wireless transceiver 142 coupled to the processor and/or the digital memory device, and capable of sending keystrokes from the alphanumeric keyboard, and a battery 146 power source coupled to the transceiver and the processor. In one aspect, the processor 130 can be electrically and operatively coupled to the keys of the alphanumeric keyboard, the battery power source, the wireless transceiver, and the digital memory device. In another aspect, the processor 134 can include the wireless transceiver and/or the digital memory device, and can be electrically and operatively coupled to the keys and the battery power source. The wireless keyboard is operable to receive keystrokes from a user and wirelessly transmit the keystrokes to the tablet computer. The transceiver of the wireless keyboard can wirelessly connect and communicate with a wireless transceiver of the tablet or other computing device. The processor, digital memory device, wireless transceiver and the battery can be disposed in the housing of the keyboard panel.

The wireless keyboard 18 and/or the keyboard panel 62 can further comprise at least two buttons 150 in one aspect, or at least three buttons in another aspect, disposed on the keyboard panel, and associated with different wireless connections between at least two different computing devices, including the tablet computer 22 and another computing device, such as a desktop computer, a cellular phone, or another tablet. The keyboard can be configured to toggle between a plurality of wireless connections with a plurality of computing devices. The keyboard can have a switching mechanism to switch between typing on different computing devices. In one aspect, at least two buttons can be disposed on the keyboard panel and associated with different wireless connections between at least two different computing devices. In another aspect, at least three buttons can be disposed on the keyboard panel and associated with different wireless connections between at least three different computing devices, including a desktop computer, a tablet computer, and a cellular phone. The keyboard can have a switching mechanism, which would allow the user to switch between typing on a smart phone, tablet or regular computer.

Referring to FIGS. 11-14, another shell 22*b* is shown which is similar in many respects to that described above, and which description is hereby incorporated herein by reference. The shell 22*b* can include an elongated indentation 160 and a loop 164 extending over the elongated indentation 160 to removably receive and secure a stylus. In addition, the kickstand 82 can include bumpers 168 or feet to secure the kickstand with respect to the support surface.

Various aspects of a wireless keyboard are described in U.S. Pat. No. 8,917,499, which is hereby incorporated herein by reference in its entirety.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A keyboard folio for a tablet computer, the keyboard folio comprising:
   a) a shell with a cavity sized and shaped to receive the tablet computer;
   b) the shell having an attachment strip along a side thereof, a front face extending along the attachment strip and being flush with an opening to the cavity of the shell; the attachment strip having ferromagnetic elements therein;
   c) a wireless keyboard magnetically coupled to the shell;
   d) the wireless keyboard having an attachment bar with ferromagnetic elements magnetically couplable to the ferromagnetic elements of the attachment strip of the shell, the wireless keyboard and the shell having two configurations, including:
   i) an attached configuration in which the wireless keyboard is magnetically coupled to the shell with the ferromagnetic elements of the attachment bar of the wireless keyboard magnetically coupled to the ferromagnetic elements of the attachment strip of the shell, and
   ii) a detached configuration in which the wireless keyboard is separated from the shell;
   e) the wireless keyboard having a keyboard panel with an alphanumeric keyboard pivotally coupled to the attachment bar, and a keyboard hinge pivotally coupling the keyboard panel to the attachment bar; and
   f) the attachment bar of the wireless keyboard magnetically and removably attaching to the attachment strip of the shell in a fixed relationship, while the keyboard panel pivots with respect to the attachment bar, and thus the shell, between:
   i) a closed orientation in which the keyboard panel and the attachment bar are against the shell and form a common planar layer, and
   ii) an open orientation in which the keyboard panel is at an obtuse angle with respect to the shell and the attachment bar, and with the keyboard panel inclined at an acute angle with respect to horizontal, and with the attachment bar of the wireless keyboard remaining in the fixed relationship with the shell.

2. The keyboard folio in accordance with claim 1, further comprising:
   b) an attachment face extending along the attachment bar of the wireless keyboard;
   c) the attachment face of the attachment bar of the wireless keyboard abutting to the front face of the attachment strip of the shell in the attached configuration;
   d) the attachment bar of the wireless keyboard being attached to a front of the shell; and
   e) the front face of the attachment strip of the shell leaving the opening to the cavity exposed, and thus being configured to expose a surface of the tablet computer, while the attachment bar of the wireless keyboard is attached to the front of the shell.

3. The keyboard folio in accordance with claim 2, wherein the front face of the attachment strip of the shell is wider than a remaining perimeter of the shell circumscribing the opening to the cavity of the shell.

4. The keyboard folio in accordance with claim 1, wherein the keyboard hinge is a flexible hinge flexibly coupling the keyboard panel and the attachment bar, and wherein the keyboard hinge is free of electrical connections between the keyboard panel and the attachment bar.

5. The keyboard folio in accordance with claim 4, wherein the flexible hinge comprises a strip of silicone.

6. The keyboard folio in accordance with claim 1, further comprising:
   an alignment structure between the wireless keyboard and the shell comprising a protrusion extending from one of the attachment strip or the attachment bar, and into a matching indentation in another of the attachment strip or the attachment bar.

7. The keyboard folio in accordance with claim 1, wherein the keyboard panel and the attachment bar of the wireless keyboard have two configurations, including: i) a flat configuration in which the keyboard panel and the attachment bar are in the common planar layer, and ii) an inclined orientation in which the attachment bar is rotated at least 90 degrees from the flat configuration and is disposable under the keyboard panel to incline the keyboard panel with respect to horizontal.

8. The keyboard folio in accordance with claim 7, wherein the wireless keyboard is capable of independent operation with respect to the shell, and is capable of wirelessly connecting to the tablet computer in the detached configuration, and capable of maintaining the inclined configuration, with the attachment bar under the keyboard panel, in the detached configuration.

9. The keyboard folio in accordance with claim 1, wherein the attachment strip of the shell defines a bottom edge when disposed on a support surface; and further comprising:
   a) a kickstand pivotally coupled to the bottom edge of the shell; and
   b) the kickstand pivoting with respect to the shell between:
   i) a retracted orientation in which the kickstand is adjacent to the shell and parallel with the shell, and
   ii) a deployed orientation in which the kickstand is at an acute angle with respect to the shell, and is parallel with the support surface, the kickstand having a plurality of different deployed orientations in which the kickstand forms different acute angles with respect to the shell.

10. The keyboard folio in accordance with claim 9, further comprising:
   a) the kickstand having a lobe extending into a notch in the shell;
   b) the lobe having a bore therein with a cross-sectional shape, and the attachment strip having a slot with a cross-sectional shape different than the cross-sectional shape of the bore of the lobe, the slot extending from a perimeter side of the shell to the notch, and the slot of the shell being aligned with the bore of the lobe of the kickstand;
   c) at least one resistance hinge coupled between the lobe and the shell, the hinge having a head with a cross-sectional shape mating with the cross-sectional shape of the bore so that the head is fixedly retained within the bore and with respect to the kickstand, the hinge having a key rotatable with respect to the head and having a cross-sectional shape mating with the cross-sectional shape of the slot so that the key is fixedly retained within the slot and with respect to the shell; and
   d) a cross-sectional size of the slot being larger than a cross-sectional size of the bore so that the hinge is capable of being inserted into the slot through the perimeter side of the shell until the head is retained in the bore of the lobe of the kickstand and the key is retained in the slot of the shell.

11. The keyboard folio in accordance with claim 9, further comprising:
   an indentation in a back side of the shell sized and shaped to receive the kickstand therein in the retracted orientation.

12. The keyboard folio in accordance with claim 9, wherein the kickstand comprises a planar metallic flap with a width extending a majority of a width of the shell, and a silicon bead extending around a majority of a perimeter edge of the flap.

13. The keyboard folio in accordance with claim 9, wherein the kickstand comprises a tab extending from the flap.

14. The keyboard folio in accordance with claim 1, wherein the keyboard panel comprises a processor coupled to the alphanumeric keyboard, a wireless transceiver coupled to the processor and capable of sending keystrokes from the alphanumeric keyboard, and a battery power source coupled to the transceiver and the processor.

15. The keyboard folio in accordance with claim 14, further comprising:
   at least two buttons disposed on the keyboard panel and associated with different wireless connections between at least two different computing devices, including the tablet computer and another computing device.

16. A keyboard folio for a tablet computer, the keyboard folio comprising:
   a) a shell with a cavity sized and shaped to receive the tablet computer;
   b) the shell having an attachment strip along a side thereof, the attachment strip having ferromagnetic elements therein;
   c) a front face extending along the attachment strip of the shell and being substantially flush with or parallel with an opening to the cavity of the shell;
   d) the front face of the attachment strip of the shell being wider than another portion of a remaining perimeter of the shell circumscribing the opening to the cavity of the shell;
   e) a wireless keyboard magnetically coupled to the shell;
   f) the wireless keyboard having an attachment bar with ferromagnetic elements magnetically couplable to the ferromagnetic elements of the attachment strip of the shell;
   g) an attachment face extending along the attachment bar of the wireless keyboard;
   h) the attachment face of the attachment bar of the wireless keyboard abutting to the front face of the attachment strip of the shell when the wireless keyboard is magnetically coupled to the shell, the attachment bar of the wireless keyboard being attached to a front of the shell;
   i) the front face of the attachment strip of the shell leaving the opening to the cavity exposed, and thus being configured to expose a surface of the tablet computer, while the attachment bar of the wireless keyboard is attached to the front of the shell;
   j) the wireless keyboard and the shell having two configurations, including:
      i) an attached configuration in which the wireless keyboard is magnetically coupled to the shell with the ferromagnetic elements of the attachment bar of the wireless keyboard magnetically coupled to the ferromagnetic elements of the attachment strip of the shell, and
      ii) a detached configuration in which the wireless keyboard is separated from the shell;
   k) the wireless keyboard having a keyboard panel with an alphanumeric keyboard pivotally coupled to the attachment bar, and a keyboard hinge pivotally coupling the keyboard panel to the attachment bar;
   l) the keyboard hinge being a flexible hinge flexible coupling the keyboard panel and the attachment bar, and the keyboard hinge being free of electrical connections between the keyboard panel and the attachment bar;
   m) the attachment bar of the wireless keyboard magnetically and removably attaching to the attachment strip of the shell in a fixed relationship, while the keyboard panel pivots with respect to the attachment bar, and thus the shell, between:
      i) a closed orientation in which the keyboard panel and the attachment bar are against the shell and form a common planar layer,
      and ii) an open orientation in which the keyboard panel is at an obtuse angle with respect to the shell, and with the keyboard panel inclined at an acute angle with respect to horizontal, and with the attachment bar of the wireless keyboard remaining in the fixed relationship with the shell;
   n) the keyboard panel and the attachment bar have two configurations, including:
      i) a flat configuration in which the keyboard panel and the attachment bar are in the common planar layer, and
      ii) an inclined orientation in which the attachment bar is rotated at least 90 degrees from the flat configuration and is disposable under the keyboard panel to incline the keyboard panel with respect to horizontal; and
   o) the wireless keyboard is capable of independent operation with respect to the shell, and is capable of wirelessly connecting to the tablet computer in the detached configuration, and capable of maintaining the inclined configuration in the detached configuration with the attachment bar under the keyboard panel.

17. The keyboard folio in accordance with claim 16, further comprising:
   a) a kickstand pivotally coupled to the shell; and b) the kickstand pivoting with respect to the shell between:
  i) a retracted orientation in which the kickstand is adjacent the shell, and
  ii) a deployed orientation in which the kickstand is at an acute angle with respect to the shell, the kickstand having a plurality of different deployed orientations in which the kickstand forms different acute angles with respect to the shell.

18. The keyboard folio in accordance with claim 17, further comprising:
  a) the kickstand having a lobe extending into a notch in the shell;
  b) the lobe having a bore therein with a cross-sectional shape, and the attachment strip having a slot with a cross-sectional shape different than the cross-sectional shape of the bore of the lobe, the slot extending from a perimeter side of the shell to the notch, and the slot of the shell being aligned with the bore of the lobe of the kickstand;
  c) at least one resistance hinge coupled between the lobe and the shell, the hinge having a head with a cross-sectional shape mating with the cross-sectional shape of the bore so that the head is fixedly retained within the bore and with respect to the kickstand, the hinge having a key rotatable with respect to the head and having a cross-sectional shape mating with the cross-sectional shape of the slot so that the key is fixedly retained within the slot and with respect to the shell; and
  d) a cross-sectional size of the slot being larger than a cross-sectional size of the bore so that the hinge is capable of being inserted into the slot through the perimeter side of the shell until the head is retained in the bore of the lobe of the kickstand and the key is retained in the slot of the shell.

19. The keyboard folio in accordance with claim 16, wherein the keyboard panel comprises a processor coupled to the alphanumeric keyboard, a wireless transceiver coupled to the processor and capable of sending keystrokes from the alphanumeric keyboard, a battery power source coupled to the transceiver and the processor, and at least two buttons disposed on the keyboard panel and associated with different wireless connections between at least two different computing devices, including the tablet computer and another computing device.

20. A keyboard folio for a tablet computer, the keyboard folio comprising:
  a) a shell with a cavity sized and shaped to receive the tablet computer;
  b) the shell having an attachment strip along a side thereof, the attachment strip having ferromagnetic elements therein;
  c) a front face extending along the attachment strip of the shell and being substantially flush with or parallel with an opening to the cavity of the shell;
  d) the front face of the attachment strip of the shell being wider than another portion of a remaining perimeter of the shell circumscribing the opening to the cavity of the shell;
  e) a wireless keyboard magnetically coupled to the shell;
  f) the wireless keyboard having an attachment bar with ferromagnetic elements magnetically couplable to the ferromagnetic elements of the attachment strip of the shell;
  g) an attachment face extending along the attachment bar of the wireless keyboard;
  h) the attachment face of the attachment bar of the wireless keyboard abutting to the front face of the attachment strip of the shell when the wireless keyboard is magnetically coupled to the shell, the attachment bar of the wireless keyboard being attached to a front of the shell;
  i) the front face of the attachment strip of the shell leaving the opening to the cavity exposed, and thus being configured to expose a surface of the tablet computer, while the attachment bar of the wireless keyboard is attached to the front of the shell;
  j) the wireless keyboard and the shell having two configurations, including:
    i) an attached configuration in which the wireless keyboard is magnetically coupled to the shell with the ferromagnetic elements of the attachment bar of the wireless keyboard magnetically coupled to the ferromagnetic elements of the attachment strip of the shell, and
    ii) a detached configuration in which the wireless keyboard is separated from the shell;
  k) the wireless keyboard having a keyboard panel with an alphanumeric keyboard pivotally coupled to the attachment bar, and a keyboard hinge pivotally coupling the keyboard panel to the attachment bar;
  l) the keyboard hinge being a flexible hinge flexible coupling the keyboard panel and the attachment bar, and the keyboard hinge being free of electrical connections between the keyboard panel and the attachment bar;
  m) the attachment bar of the wireless keyboard magnetically and removably attaching to the attachment strip of the shell in a fixed relationship, while the keyboard panel pivots with respect to the attachment bar, and thus the shell, between:
    i) a closed orientation in which the keyboard panel is against the shell, and
    ii) an open orientation in which the keyboard panel is at an obtuse angle with respect to the shell, and with the keyboard panel inclined at an acute angle with respect to horizontal, and with the attachment bar of the wireless keyboard remaining in the fixed relationship with the shell;
  n) the keyboard panel and the attachment bar have two configurations, including:
    i) a flat configuration in which the keyboard panel and the attachment bar are in a common planar layer defined by the keyboard panel, and
    ii) an inclined orientation in which the attachment bar is rotated at least 90 degrees from the flat configuration and is disposable under the keyboard panel to incline the keyboard panel with respect to horizontal;
  o) the wireless keyboard is capable of independent operation with respect to the shell, and is capable of wirelessly connecting to the tablet computer in the detached configuration, and capable of maintaining the inclined configuration in the detached configuration with the attachment bar under the keyboard panel;
  p) a kickstand pivotally coupled to a bottom edge of the shell, the bottom edge being defined by the attachment strip of the shell;
  q) the kickstand pivoting with respect to the shell between:
    i) a retracted orientation in which the kickstand is adjacent the shell, and
    ii) a deployed orientation in which the kickstand is at an acute angle with respect to the shell, the kickstand having a plurality of different deployed orientations in which the kickstand forms different acute angles with respect to the shell;

r) the kickstand having a lobe extending into a notch in the shell;

s) the lobe having a bore therein with a cross-sectional shape, and the attachment strip having a slot with a cross-sectional shape different than the cross-sectional shape of the bore of the lobe, the slot extending from a perimeter side of the shell to the notch, and the slot of the shell being aligned with the bore of the lobe of the kickstand;

t) at least one resistance hinge coupled between the lobe and the shell, the hinge having a head with a cross-sectional shape mating with the cross-sectional shape of the bore so that the head is fixedly retained within the bore and with respect to the kickstand, the hinge having a key rotatable with respect to the head and having a cross-sectional shape mating with the cross-sectional shape of the slot so that the key is fixedly retained within the slot and with respect to the shell; and u) a cross-sectional size of the slot being larger than a cross-sectional size of the bore so that the hinge is capable of being inserted into the slot through the perimeter side of the shell until the head is retained in the bore of the lobe of the kickstand and the key is retained in the slot of the shell.

\* \* \* \* \*